(12) United States Patent
Korthauer et al.

(10) Patent No.: US 10,430,677 B2
(45) Date of Patent: Oct. 1, 2019

(54) METHOD FOR CLASSIFYING DRIVER MOVEMENTS

(71) Applicant: Robert Bosch GmbH, Stuttgart (DE)

(72) Inventors: Andreas Korthauer, Stuttgart (DE); Hans-Joachim Bieg, Weil Im Schoenbuch (DE); Jonathan Fischer, Ellhofen (DE); Wolfgang Krautter, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/066,378

(22) PCT Filed: Dec. 14, 2016

(86) PCT No.: PCT/EP2016/080972
§ 371 (c)(1),
(2) Date: Jun. 27, 2018

(87) PCT Pub. No.: WO2017/125211
PCT Pub. Date: Jul. 27, 2017

(65) Prior Publication Data
US 2019/0005341 A1  Jan. 3, 2019

(30) Foreign Application Priority Data

Jan. 21, 2016 (DE) .......... 10 2016 200 856
Aug. 17, 2016 (DE) .......... 10 2016 215 291

(51) Int. Cl.
G08B 23/00 (2006.01)
G06K 9/00 (2006.01)
B60W 40/08 (2012.01)

(52) U.S. Cl.
CPC ......... *G06K 9/00845* (2013.01); *B60W 40/08* (2013.01); *G06K 9/00335* (2013.01); *B60W 2040/0818* (2013.01)

(58) Field of Classification Search
CPC .. G06K 9/00845; B60W 40/08; B60W 40/09; B60W 2040/0818; G02B 27/0093
(Continued)

(56) References Cited

U.S. PATENT DOCUMENTS 5,689,241 A * 11/1997 Clarke, Sr. ............... A61B 5/18
340/575
6,927,694 B1 * 8/2005 Smith .................. B60K 28/066
340/573.1
(Continued)

FOREIGN PATENT DOCUMENTS

DE 102005021141 A1 11/2006
DE 102009005730 A1 7/2010
(Continued)

OTHER PUBLICATIONS

International Search Report for PCT/EP2016/080972, dated Mar. 2, 2017.

*Primary Examiner* — Toan N Pham
(74) *Attorney, Agent, or Firm* — Norton Rose Fulbright US LLP; Gerard Messina

(57) ABSTRACT

A method for classifying driver movements in order to ascertain the driver's degree of attentiveness during the driving a motor vehicle, using an interior compartment camera for recording at least a part of the driver. Based on the recording, a movement quantity that represents a head movement of the driver is evaluated, and a driver movement is classified as a safety view if the movement quantity corresponds to a defined condition.

10 Claims, 3 Drawing Sheets

(58) Field of Classification Search
USPC ...................................... 340/576, 575, 573.1
See application file for complete search history.

(56) References Cited

U.S. PATENT DOCUMENTS

| | | | | |
|---|---|---|---|---|
| 2014/0052333 | A1* | 2/2014 | Elder ...................... | G06F 17/00 |
| | | | | 701/36 |
| 2014/0276090 | A1* | 9/2014 | Breed ...................... | A61B 5/18 |
| | | | | 600/473 |
| 2015/0109429 | A1* | 4/2015 | Inoue ...................... | A61B 5/18 |
| | | | | 348/78 |
| 2015/0203126 | A1* | 7/2015 | Kobana ................. | B60W 50/12 |
| | | | | 701/93 |

FOREIGN PATENT DOCUMENTS

| | | |
|---|---|---|
| DE | 102012021249 A1 | 5/2014 |
| DE | 102013000131 A1 | 7/2014 |
| DE | 102013210941 A1 | 12/2014 |
| DE | 102013013227 A1 | 2/2015 |
| DE | 102014201282 A1 | 7/2015 |
| DE | 102014213285 A1 | 1/2016 |

* cited by examiner

METHOD FOR CLASSIFYING DRIVER MOVEMENTS

The present invention relates to a method for classifying driver movements in order to ascertain the driver's attentiveness when driving a motor vehicle, using an interior compartment camera for recording at least a part of the driver. Based on the recording, a movement quantity representing a head movement of the driver is evaluated, and a driver movement is classified as a safety view when the movement quantity corresponds to a defined condition. In addition, the present invention relates to a device and to a computer program that are set up to carry out the method.

BACKGROUND INFORMATION

German Patent Application No. DE 10 2013 210 941 A1 describes a method for operating a vehicle, the driving of the vehicle by a driver being monitored so that, based on the monitored driving, a driving parameter that describes the driving style of the driver is formed that is provided to a driver assistance system of the vehicle, so that when the vehicle is controlled using the driver assistance system the driving style of the driver is at least partly reproduced. Here, for example, the monitoring of the driving by the driver can be carried out using at least one sensor. Based on the corresponding measurement data of the sensors, the driving parameters can be formed. For example, using an interior compartment camera including a video sensor it can be monitored whether the driver regularly looks over his/her shoulder, for example when intending to change lanes or when turning.

In addition, German Patent Application No. DE 10 2009 005 730 describes a method for monitoring the attentiveness of a driver of a motor vehicle, having the following steps: ascertaining an actual direction of view, i.e., the direction in which the driver is looking; ascertaining a target direction of view, i.e., the direction in which the driver should look in order to safely drive the motor vehicle; evaluation of the actual direction of view based on the target direction of view in order to determine the attentiveness or inattentiveness of the vehicle driver; ascertaining a specified time within which inattentiveness of the vehicle driver can be tolerated; upon determining inattentiveness of the vehicle driver, acquisition of the time duration of the inattentiveness and comparison of this with the specified time; and issuing an alarm to the vehicle driver when the time duration is exceeded. In the method, the target direction of view and/or the specified time are ascertained as a function of a setting of a travel direction indicator, information concerning the course of a roadway in front of the motor vehicle, and/or information from a lane keeping assistant system.

In addition, in general an estimation of the direction of view of the driver is useful in order for example to check whether the driver is looking at the roadway in front of him/her and paying attention to the present traffic situation. Safety systems and driver assistance functions can make use of this information, for example by adapting warning steps as a function of the degree of attentiveness. Methods for checking the driver's attentiveness with respect to the traffic situation usually use (A) an observation system that makes it possible to estimate the head orientation of the driver and/or the direction of view of the driver, and (B) a comparison of the head orientation and/or direction of view with a plane that is to be regarded of the traffic situation (region of interest (ROI) or area of interest (AOI)). Diversion or inattentiveness is assumed if for example a deviation is recognized between the head orientation/direction of view and the defined ROI. However, this approach leads to difficulties when the driver shows behavior that indicates attentiveness but also has the result that the driver moves his head orientation/direction of view away from the ROI, such as when the driver looks over his/her shoulder or looks at the side mirror.

SUMMARY

An example method according to the present invention makes it possible to reduce the risk of misinterpretations of driver movements, and makes it possible to optimize the reliability of the system. Developments of the present invention are described herein.

The example method according to the present invention for classifying driver movements for ascertaining driver attentiveness when driving a motor vehicle, using an interior compartment camera for recording at least a part of the driver, is characterized in that based on the recording a movement quantity representing a head movement of the driver is evaluated, and a driver movement is classified as a safety view when the movement quantity corresponds to a defined condition.

This is understood as meaning that a movement of the driver is regarded as a safety view when it fulfills one or more determinate requirements. As a requirement, it can be defined that a movement aspect corresponds to a defined threshold value, or exceeds or falls below this value. Alternatively, boundary values can also be defined as requirements. In addition, it can be defined that a particular aspect has to take place within a defined time interval in order for a condition to be regarded as met. A safety view is here understood in particular as being a look over the shoulder (simple, in one direction, or double, in two opposed directions), a look at the side mirror (also simple, at one side mirror, or double, at both side mirrors), or looking at the rearview mirror.

Advantageously, in this way a misclassification of driver movements can be avoided. That is, the method enables for example the avoidance of incorrect classifications of movements that actually engage the driver's attention, but that in previous algorithms not using the method according to the present invention were recognized as being movements representing a distraction. In this way, the method enables an optimization of the ascertaining of the driver's attentiveness. Here there results an improvement in the reliability of the overall system for ascertaining driver attentiveness. There also takes place an increase in the quality of the output of the system for recognizing attentiveness.

In an advantageous specific example embodiment, the method is characterized in that the driver movement is classified as a safety view if a lateral head movement is recognized as the movement quantity.

This is understood as meaning that the named defined condition is a lateral head movement. A lateral head movement is a head movement to one side, starting from an initial position. The initial position can in particular be an orientation suitable for a direction of view in the direction of travel to the front, or alternatively in the direction of the region of interest. In this sense, a lateral head movement can be regarded as a head rotation in a direction. The simple recognition of a lateral head movement proves advantageous here. Moreover, in this way an acceptable degree of validity is already obtained with regard to the recognition of safety views and the ascertaining of driver attentiveness.

In a possible example embodiment of the present invention, the method is characterized in that a lateral head movement is recognized when, starting from a first head orientation, a beginning of a head rotation in a first direction is ascertained, a beginning of a head rotation in the first direction being ascertained in particular when a speed of the head rotation in the first direction corresponds to a defined first speed threshold value, or exceeds a defined first speed threshold value.

This is understood as meaning that the method ascertains the beginning of the head rotation and infers a lateral head movement when a beginning of a head rotation is recognized. For this purpose, in particular the speed of the head movement is ascertained and investigated. The speed of movement of the head represents the movement quantity that has to correspond to a defined condition. Surprisingly, it was found that at a speed of 50° per second, the beginning of a head rotation can be assumed. In addition, it was discovered that a head rotation does not take place with significantly lower speeds. The defined first speed threshold value can therefore advantageously be defined as being of the order of magnitude of 50° per second. This speed threshold value is to be understood as a magnitude. For example, this value can be used both for a head rotation to the left, at +50° per second, and for a head rotation to the right, at −50° per second. Here the signs are advantageously noted in order to recognize in which direction the head rotation is taking place. In addition, in this way it can be checked in a later step whether both a head rotation in one direction and also a head rotation in another direction have taken place, and whether each satisfies the corresponding conditions. The conditions for recognizing a lateral head movement are advantageously the same for both directions (with the exception of the differing signs). However, these may also be different. For example, these may be different for the first recognized direction (to the left or to the right) and the second recognized direction (to the right or to the left. Here, the simple ascertaining of the speed (for example as derivative of the movement) proves advantageous. In addition, this approach offers in particular increased reliability in the identification of safety views. The first head orientation is to be understood in particular as an orientation of the head with a view in the direction of travel and/or with a view towards a defined ROI.

In a preferred example embodiment of the present invention, the method is characterized in that a lateral head movement is recognized when the speed of the head rotation in the first direction corresponds to a defined second speed threshold value or exceeds a defined second speed threshold value.

This is understood as meaning that the method infers a lateral head movement when a head movement having a second speed is recognized. Surprisingly, it was discovered that lateral head movements in most cases reach a speed of 90° per second. It was discovered that, given a measurement of a movement speed of 90° per second, there is a high probability that a lateral head movement is taking place. The defined first speed threshold value can therefore advantageously be defined as being of the order of magnitude of 90° per second. Here, the relatively simple ascertaining of the speed again proves advantageous. In addition, the good recognition quality of head rotations using this criterion turns out in particular to be advantageous.

In a preferred example embodiment of the present invention, the method is characterized in that a lateral head movement is not recognized if after the reaching or exceeding of the first, or second, speed threshold value, the speed of the head rotation in the first direction falls below a first, or second, speed boundary value.

This is to be understood as meaning that a recognition of a lateral head movement is denied when the first (alternatively, the second) speed threshold has been reached or exceeded, but subsequently, before the expiration of the time limit, a defined first (alternatively, a defined second) speed boundary value is fallen below. In this case, the recognition of a lateral head movement is not made, and the ascertaining begins again. The condition advantageously ends when the next analysis step is reached. For example, the check of whether the second speed boundary value has been fallen below can end with the start of the check of whether the first movement threshold has been reached. Advantageously, the quality of the results is further increased through the implementation of this further criterion for ascertaining the safety view.

In an alternative development of the present invention, the method is characterized in that a lateral head movement is recognized when a scope of movement of the head rotation in the first direction corresponds to a defined first movement threshold or exceeds a defined first movement threshold.

This is to be understood as meaning that the scope of movement of the head rotation has to correspond to a defined condition for the head movement to be classified as a safety view. Here, in particular the angle of rotation of the head movement can be understood as the scope of movement. Surprisingly, it was discovered that given a scope of movement of 45°, a safety view, in particular a look over the shoulder, can be assumed. The defined first movement threshold can therefore advantageously be defined as being of the order of magnitude of 45°.

Advantageously, through the use of this further criterion the quality of results can be improved. In addition, the ascertaining of the scope of movement is easily possible using the existing sensor equipment.

In a possible specific example embodiment of the present invention, the method is characterized in that the driver movement is classified as a safety view if a lateral head movement and a medial head movement are recognized as the movement quantity.

This is understood as meaning that a head movement is regarded as a safety view if at first there is a lateral head movement and subsequently there is a medial head movement. A medial head movement can be understood as a head rotation that takes place in the opposite direction from the lateral head movement, i.e. a movement of the rotated head back to the initial position. The respective directions are therefore opposite one another. For example, a head rotation made going from a view in the direction of travel to the left, as a lateral head movement, takes place in order to look over the left shoulder. Subsequently, from this position there takes place a rotation of the head to the right as a medial head movement, until the view is again in the direction of travel. Here it turns out to be advantageous to monitor not only the movement to a rotated head position but also the return movement to the initial position. In this way, it is possible to avoid misinterpretations of particular movements as a safety view, for example when there is a longer view to the side of the vehicle.

In a preferred example embodiment of the present invention, the method is characterized in that a medial head movement is recognized if, following a lateral head movement, a beginning of a head rotation in a second direction is ascertained, a beginning of a head rotation in the second direction being ascertained in particular if a speed of the head rotation in the second direction corresponds to a defined third speed threshold value or exceeds a defined third speed threshold value.

This feature is to be understood analogously to the ascertaining of the beginning of the lateral head movement, with the difference that now first the monitoring of the lateral head movement takes place, and subsequently the monitoring of the beginning of the medial head movement takes place. The third speed threshold value for identifying the beginning of the medial head movement is (like the first speed threshold value) 50° per second. However, the sign is inverted relative to the first speed threshold value, because the movement of the head has to take place in the other direction in order to move back to the starting point. Advantageously, in this method step it has turned out that due to the detailed monitoring of the medial head rotation, the output quality is increased and misclassifications can be reduced.

In an advantageous development of the present invention, the method is characterized in that a medial head movement is recognized when the speed of the head rotation corresponds to a defined fourth speed threshold value or exceeds a defined fourth speed threshold value.

This feature is to be understood analogously to the ascertaining of the lateral head movement using the second movement speed.

The fourth speed threshold value for identifying the medial head movement is (like the second speed threshold value) 90° per second. However, the sign is inverted relative to the second speed threshold value, because the movement of the head has to take place in the other direction in order to return to the starting point. Advantageously, through the use of this criterion a more detailed monitoring of the movement profile and adaptation of the estimation of the degree of attentiveness present takes place. In this way, the quality of the recognition of a safety view is increased.

In a preferred embodiment of the present invention, the method is characterized in that a medial head movement is recognized when a scope of movement of the head rotation in the second direction corresponds to a defined second movement threshold or exceeds a defined second movement threshold, or when the speed of the head rotation in the second direction falls below a defined third speed boundary value.

The feature speed boundary value is to be understood analogously to the ascertaining of the lateral head movement, but with the difference that reaching or falling below the speed boundary value does not result in denying, but rather confirming, the presence of the medial head movement.

It has been ascertained that if the value of 50° per second is fallen below, a termination of the medial head movement can be assumed. The speed boundary can therefore be set as being of the order of magnitude of 50° per second. Alternatively, a confirmation of the medial head movement is reached when the head has again reached its initial position. The condition "second movement threshold" is defined for this. Here, this can represent an angular threshold value, this angular threshold value corresponding in particular to the angular threshold value of the lateral movement. Alternatively, the condition can also be defined as a zero crossing relative to the original head orientation or the required head orientation with regard to the ROI. Advantageously, through this condition a termination of the medial head movement can be ascertained. This results in a more detailed monitoring of the movement profile and adaptation of the estimation of the present degree of attentiveness. In this way, an increased quality of output with regard to the recognized safety views is enabled.

In an alternative development of the present invention, the method is characterized in that a driver movement is classified as a safety view when, as movement quantity, a lateral head movement in a first direction with a subsequent medial head movement, as well as a lateral head movement in a second direction with a subsequent medial head movement in the first direction, is acquired.

This is to be understood as meaning that a driver movement is recognized as a safety view if for example first a head rotation to the left side of the vehicle and then a head rotation to the right side of the vehicle take place, in each case with a return of the head orientation to the initial position. Alternatively, of course, this can also take place in the other sequence. In this way, a two-part view of the driver, for example over the left and right shoulder or at the left and right outside mirror, is ascertained as a safety view. The ascertaining of the second lateral and/or medial head movement can take place analogously to the method steps and conditions described for the ascertaining of the first lateral and/or medial head movement.

Here it is to be noted that correspondingly, if warranted, the change of sign has to be taken into account for speeds and movements. In this way, further movement patterns are advantageously recognized as a safety view, thus achieving an increased quality in the ascertaining of the degree of attentiveness.

In particular, the example method according to the present invention advantageously includes at least one of the following steps: ascertaining of data; pre-processing of the data; analysis of pre-processed data.

In a preferred example development of the present invention, the method is characterized in that the driver movement is classified as a safety view if the movement quantity within a defined time limit corresponds to the defined condition.

This is to be understood as meaning that the described conditions each have to be met within a specified time span. If they are not met within the defined time, it is assumed that the driver movement is not a safety view. As long as the defined time (or other restrictions) has not yet expired, it continues to be checked whether the respective condition is met. Here, a different time boundary value (or of course the same time boundary value) can be defined for each of the conditions of the various method steps. In particular, however, it is provided that only one time boundary value is provided for all the method steps. Here it has been identified that a (simple) safety view, as a rule, does not exceed 2 seconds. Therefore, the time boundary value can advantageously be defined as being of the order of magnitude of 2 seconds. That is, the driver movement is classified as a simple safety view if all the required conditions are met within 2 seconds. In the ascertaining of a double safety view, two time boundary values (one each for a safety view in each direction) are taken into account, advantageously again at 2 seconds each. By taking into account the time limit, an additional criterion is introduced. This advantageously supports the correct classification of driver movements, and optimizes the output quality.

In a possible example embodiment of the present invention, a method is provided for determining the degree of attentiveness of the driver, a reduced degree of attentiveness of the driver being inferred when the driver's view is diverted away from a defined region. This method is characterized in that it is checked, corresponding to one of the method steps described above, whether a driver movement is to be classified as a safety view, and, given a classification of a driver movement as a safety view, a degree of attentiveness of the driver that is not reduced is inferred, and/or this movement is not taken into account in the evaluation of attentiveness.

This is to be understood as meaning that the degree of attentiveness of a driver is ascertained. The attentiveness is frequently determined via the direction of view of the driver.

Here, a diverting of the view away from the ROI indicates a lack of attentiveness. From the driver movement, in particular from the head movement, a direction of view of the driver can be inferred. If this direction lies outside the ROI, then, in current attentiveness monitoring systems, a lack of attentiveness is inferred. In the example ascertaining of attentiveness, however, it is now analyzed whether a driver movement can be regarded as a safety view corresponding to the described conditions. If this is the case, then the corresponding driver movement is not evaluated as inattentiveness. For example, this movement can be left out of account in the ascertaining of attentiveness. Instead, for example the movement can be in contrast evaluated as an indicator of attentiveness. In this way, there results an improved ascertaining of the actual degree of attentiveness and an avoidance of misclassifications. Advantageously, through the more precise knowledge of the actual degree of attentiveness, an adaptation of warning strategies for the driver can take place, and for example unnecessary warnings can be avoided.

In addition, according to the present invention a device is provided that is set up to carry out the described method.

This is to be understood as meaning that a control device and/or some other computing unit is provided for the motor vehicle that is designed, i.e., is set up and/or has suitable equipment, to carry out or to support a method as described above. The device for classifying driver movements in order to ascertain the degree of driver attentiveness when driving a motor vehicle, having an interior compartment camera for recording at least a part of the driver, is for example characterized in that based on the recording a movement quantity that represents a head movement of the driver can be evaluated, and a driver movement can be classified as a safety view if the movement quantity corresponds to a defined condition.

In addition, according to the present invention a computer program is provided that is set up to carry out the described method.

It is to be noted that the features described individually herein can be combined with one another in any technically appropriate manner, and indicate further embodiments of the present invention. Further features and uses of the present invention result from the description herein of exemplary embodiments on the basis of the Figures.

DETAILED DESCRIPTION OF EXAMPLE EMBODIMENTS

Figure 1:
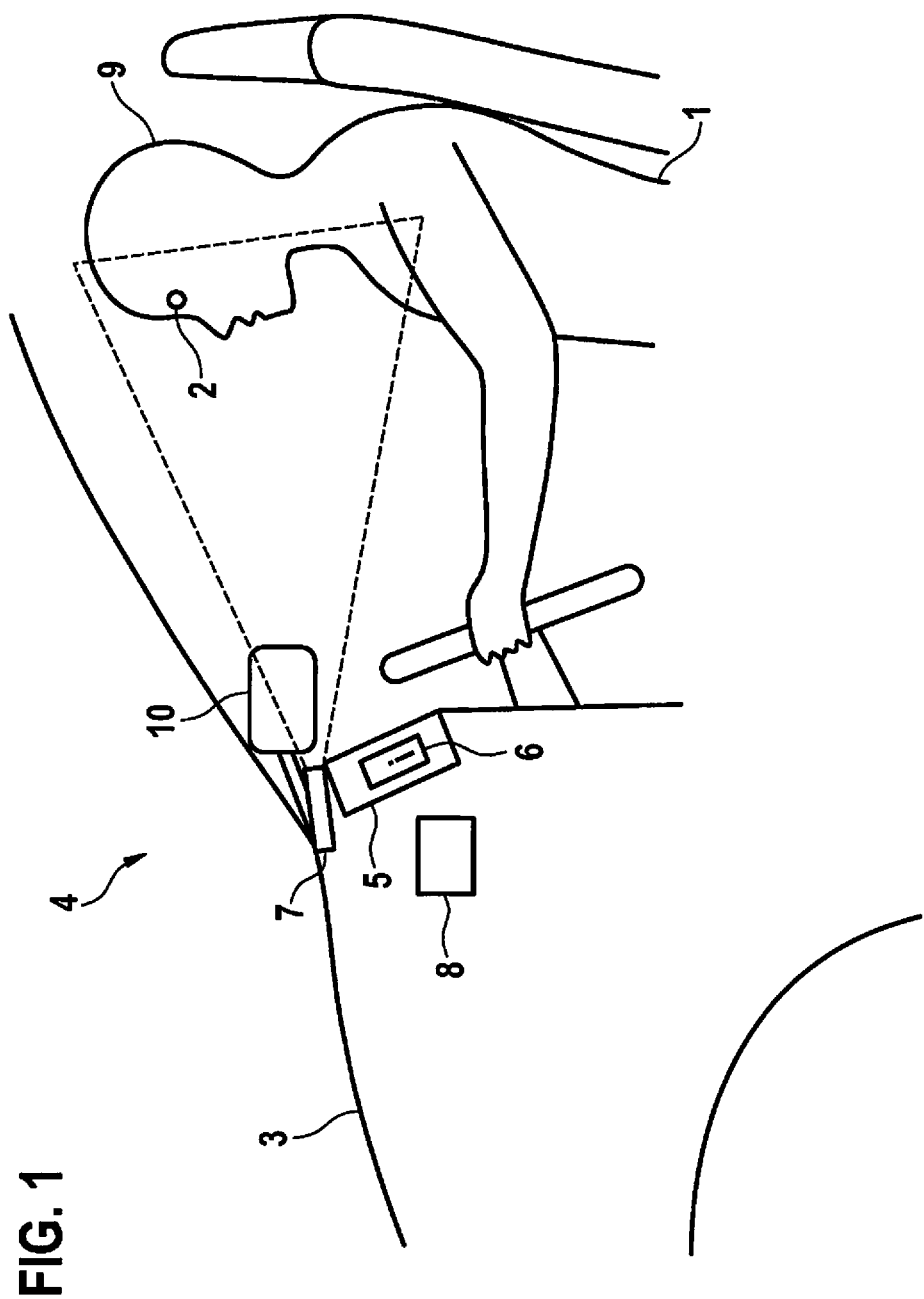
FIG. 1 shows a schematic representation of the devices for the use of the method in a motor vehicle according to a possible embodiment of the present invention.

FIG. 1 shows a schematic representation of an example of a device for applying the method in a motor vehicle in accordance with an example embodiment of the present invention. Here, a driver 1 is shown in a motor vehicle 3. Vehicle 3 has a driver assistance system 4 for ascertaining the degree of attentiveness of driver 1. For this purpose, attentiveness features are observed using an interior compartment sensor system 7. In the depicted embodiment, an interior compartment sensor system 7, realized as a camera, observes the direction of view of eyes 2 of driver 1. Movements of the head 9 of driver 1, in particular safety views, are also monitored. Looks over the shoulder or looks at the side mirror or mirrors 10 can be understood as safety views. In addition, a regulation and control device 8 is provided for carrying out the method. This device can also be set up to pre-process the data ascertained by interior compartment sensor system 7, and/or to carry out a parameter calculation. In addition, a device 5 is provided for outputting items of information 6 to driver 1. This device 5 is realized as a display that outputs visual warning indications as items of information 6 to the driver when attentiveness is not present. Of course, devices (for example loudspeakers) that enable auditory communication (for example via loudspeakers) or haptic transmission (for example via steering wheel or seat vibrations) of items of information 6 to driver 1.

Figure 2:
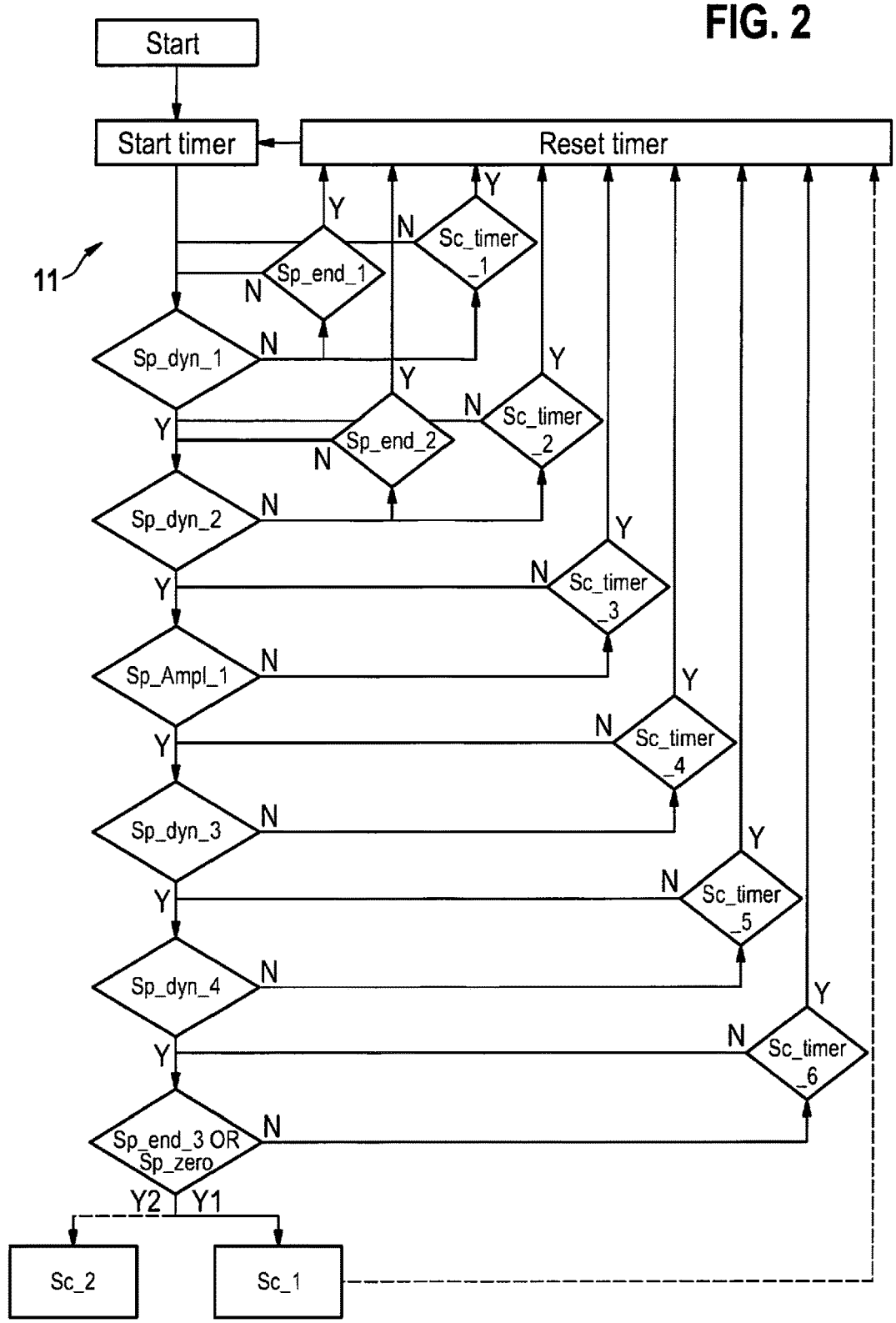
FIG. 2 shows a process diagram of the method according to a possible embodiment of the present invention.

FIG. 2 shows a process diagram of method 11 according to a possible embodiment. Method 11 starts at a first step "Start." Subsequently, a time acquisition "Start_timer" is started. Subsequently, it is checked whether a first speed threshold "Sp_dyn_1" is reached or exceeded. This first speed threshold "Sp_dyn_1" represents a starting point of a lateral head movement in a first direction. It is approximately 50° per second in this first direction. If the first speed threshold "Sp_dyn_1" is not reached "N," then it is checked whether a first speed boundary value "Sp_end_1" is fallen below. In addition, it is checked whether a first time boundary value "Sc_timer_1" is exceeded. If the defined first speed threshold "Sp_dyn_1" has been fallen below "Y," the time acquisition is stopped and is set to "Null," "Reset_timer." Subsequently, the method begins again and the time acquisition is started again, "Start_timer." The same procedure takes place if the first time boundary "Sc_timer_1" was exceeded, "Y." Here, a stop and restart takes place already when one of the two conditions is met. If both the first time boundary value "Sc_timer_1" is not yet exceeded "N," and the first speed boundary value "Sp_end_1" is not fallen below "N," then it is further checked whether the first speed threshold "Sp_dyn_1" is reached, in the next measurement step.

If the first speed threshold "Sp_dyn$_{13}$ 1" is reached "Y," then it is further checked whether a second speed threshold "Sp_dyn_2" is reached. This second speed threshold "Sp_dyn_2" is a reference speed of a lateral head movement in a first direction. It is approximately 90° per second. If second speed threshold "Sp_dyn_2" is not reached "N," then it is checked whether a second speed boundary value "Sp_end_2" is fallen below. In addition, it is checked whether a second time boundary value "Sp_timer_2" is exceeded. If the defined second speed threshold "Sp_dyn_2" has been fallen below "Y," then the time acquisition is stopped and is set to "Null," "Reset_timer." Subsequently, the method is begun again and the time acquisition is restarted "Start_timer." The same procedure takes place when second time boundary value "Sc_timer_2" has been exceeded "Y." Here, a stop and restart takes place already when one of the two conditions is met. If both the second time boundary value "Sc_timer_2" is not yet exceeded "N" and the second speed boundary value "Sp_end_2" is not fallen below "N," it is further checked whether the second speed threshold "Sp_dyn_2" is reached in the next measurement step.

If the second speed threshold "Sp_dyn_2" is reached or exceeded, then it is checked whether a first movement threshold "Sp_Ampl_1" is reached. This first movement threshold "Sp_Ampl_1" is a reference deflection of a lateral head movement in a first direction. It is approximately 45°. If first movement threshold "Sp_Ampl_1" is not reached "N," then it is checked whether a third time boundary value "Sc_timer_3" is exceeded. If the defined third time boundary value "Sc_timer_3" has been exceeded "Y," then the time acquisition is stopped and set to "Null," "Reset_timer." If the third time boundary value "Sc_timer_3" is not yet exceeded "N," it is further checked whether the first movement threshold "Sp_Ampl_1" is reached in the next measurement step.

If the first movement threshold "Sp_Ampl_1" is reached or exceeded "Y," it is checked whether a third speed threshold "Sp_dyn_3" is reached. This third speed threshold "Sp_dyn_3" represents a starting point of a lateral head movement in a second direction that is opposite to the first direction. "Sp_dyn_2" is approximately 50° per second in this second direction. If the third speed threshold "Sp_dyn_3" is not reached "N," it is checked whether a fourth time boundary value "Sc_timer_4" is exceeded. If the defined fourth time boundary value "Sc_timer_4" is exceeded "Y," the time acquisition is stopped and is set to "Null," "Reset_timer." If the fourth time boundary value "Sc_timer_4" is not yet exceeded "N," it is further checked whether the third speed threshold "Sp_dyn_3" is reached in the next measurement step.

If the third speed threshold "Sp_dyn_3" is reached or exceeded "Y," then it is checked whether a fourth speed threshold "Sp_dyn_4" is reached. This fourth speed threshold "Sp_dyn_4" represents a reference value of a lateral head movement in a second direction that is opposite the first direction.

"Sp_dyn_4" is approximately 90° per second in this second direction. If fourth speed threshold "Sp_dyn_4" is not reached "N," then it is checked whether a fifth time boundary value "Sc_timer_5" is exceeded. If the defined fifth time boundary value "Sp_timer_5" is exceeded "Y," the time acquisition is stopped and is set to "Null," "Reset_timer." If the fifth time boundary value "Sc_timer_5" is not yet exceeded "N," then it is further checked whether the fourth speed threshold "Sp_dyn_4" is reached in the next measurement step.

If the fourth speed threshold "Sp_dyn_4" is reached or exceeded "Y," then it is checked whether a third speed boundary value "Sp_end_3" is reached or fallen below, or whether an oppositely directed movement threshold "Sp_zero" is reached or exceeded. This third speed boundary value "Sp_end_3" represents a minimum speed of a medial head movement. It is approximately 50° per second. The oppositely directed movement threshold "Sp_zero" represents a reference deflection of a medial head movement. It is approximately the same size as movement threshold "Sp_Ampl_1" of the lateral head movement. "Sp_zero" can in particular also be defined as the "zero crossing" of the head rotation with regard to the direction of view in the direction of travel, or with regard to the ROI. If the third speed boundary value "Sp_end_3" is not reached "N," it is checked whether a sixth time boundary value "Sc_timer_6" is exceeded. If the defined sixth time boundary value "Sp_timer_6" is exceeded "Y," the time acquisition is stopped and is set to "Null," "Reset_timer." If the sixth time boundary value "Sc_timer_6" is not yet exceeded "N," it is further checked whether the third speed boundary value "Sp_end_3" is reached or fallen below in the next measurement step, or whether an oppositely directed movement threshold "Sp_zero" is reached or exceeded in the next measurement step.

If the third speed boundary value "Sp_end_3" is reached or fallen below "Y1," or if the oppositely directed movement threshold "Sp_zero" is reached or exceeded "Y1," it is assumed that a simple look over the shoulder "Sc_1" is present. Subsequently, the time acquisition is stopped "Reset_timer" and restarted "Start_timer." In addition, in a second pass it is checked whether a double look over the shoulders "Sc_2" is present. Here, the method is run through again, only the signs of the speeds and movements being inverted.

The time boundary values "Sp_end" can be separately defined for each step. In particular, however, it is provided that a time boundary value is defined for all steps. This time acquisition begins with the step "Start_timer" and runs until the method terminates, or until the step "Reset_timer."

The speed boundary values "Sp_dyn" can be defined for a first lateral and medial head movement separately from the second lateral and medial head movement. In particular, however, it is provided that the speed boundary values are the same for both movements.

Figure 3:
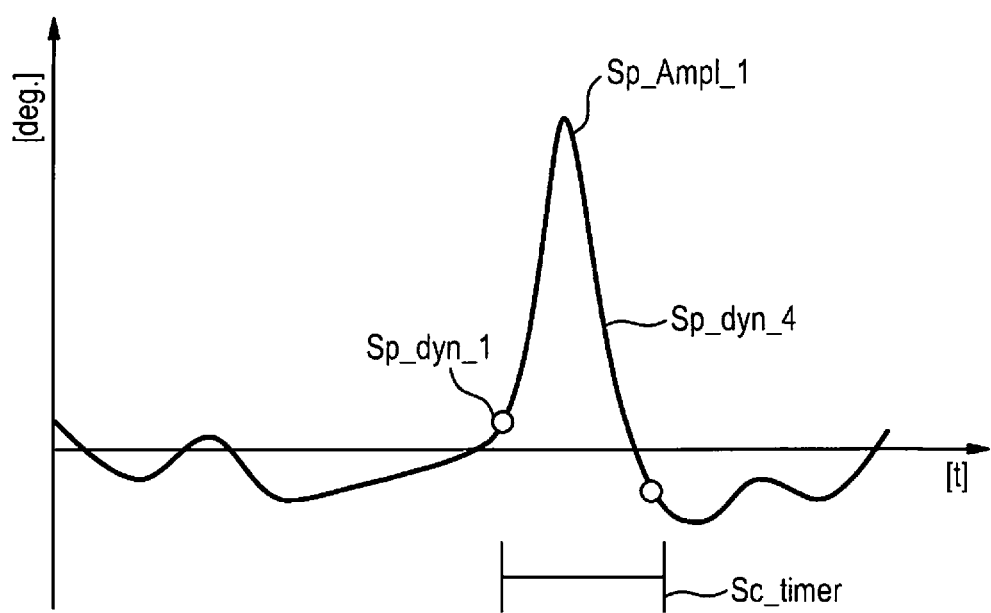
FIG. 3 shows a course of a head movement over time during a safety view, according to a possible embodiment of the present invention.

FIG. 3 shows a course of a head movement over time in the case of a safety view according to a possible embodiment of the present invention. Here, the depicted line shows the head angle of rotation (deg.) over time (t). In addition, the following points are depicted: first speed threshold "Sp_dyn_1," first movement threshold "Sp_Ampl_1," fourth speed threshold "Sp_dyn_4." The time boundary value "Sc_timer," starting from the first speed threshold "Sp_dyn_1," is also shown.

What is claimed is:

1. A method for classifying driver movements for ascertaining a degree of driver attentiveness during driving of a motor vehicle, using an interior compartment camera, the method comprising:
   recording at least a part of the driver;
   based on the recording, evaluating a movement quantity representing a head movement of the driver; and
   classifying the head movement of the driver as a safety view if the movement quantity corresponds to a defined condition;
   wherein the head movement of the driver is classified as the safety view if a lateral head movement is recognized as the movement quantity;
   wherein the lateral head movement is recognized if, starting from a first head orientation, a beginning of a head rotation in a first direction is ascertained, a beginning of a head rotation in the first direction being ascertained if a speed of the head rotation in the first direction corresponds to a defined first speed threshold value or exceeds a defined first speed threshold value.

2. The method as recited in claim 1, wherein the lateral head movement is recognized if the speed of the head rotation in the first direction corresponds to a defined second speed threshold value or exceeds a defined second speed threshold value.

3. The method as recited in claim 2, wherein the lateral head movement is not recognized if, after the reaching or exceeding of the first or second speed threshold value, the speed of the head rotation in the first direction falls below a first or second speed boundary value.

4. A method for classifying driver movements for ascertaining a degree of driver attentiveness during driving of a motor vehicle, using an interior compartment camera, the method comprising:
recording at least a part of the driver;
based on the recording, evaluating a movement quantity representing a head movement of the driver; and
classifying the head movement of the driver as a safety view if the movement quantity corresponds to a defined condition;
wherein the head movement of the driver is classified as a safety view if a lateral head movement and a medial head movement are recognized as the movement quantity;
wherein the medial head movement is recognized if, following the lateral head movement, a beginning of a head rotation in a second direction is ascertained, a beginning of a head rotation in the second direction being ascertained if a speed of the head rotation in the second direction corresponds to a defined third speed threshold value or exceeds the defined third speed threshold value.

5. The method as recited in claim 4, wherein a medial head movement is recognized when the speed of the head rotation corresponds to a defined fourth speed threshold value or exceeds the defined fourth speed threshold value.

6. The method as recited in claim 5, wherein the medial head movement is recognized when one of: (i) a scope of movement of the head rotation in the second direction corresponds to a defined second movement threshold or exceeds a defined second movement threshold, or (ii) when the speed of the head rotation in the second direction falls below a defined third speed boundary value.

7. A method for classifying driver movements for ascertaining a degree of driver attentiveness during driving of a motor vehicle, using an interior compartment camera, the method comprising:
recording at least a part of the driver;
based on the recording, evaluating a movement quantity representing a head movement of the driver; and
classifying the head movement of the driver as a safety view if the movement quantity corresponds to a defined condition;
wherein the driver movement is classified as a safety view when a lateral head movement in a first direction with a subsequent medial head movement as well as a lateral head movement in a second direction with a subsequent medial head movement in the first direction is acquired as the movement quantity.

8. A method for determining a degree of attentiveness of a driver, a reduced attentiveness of the driver being inferred when the view of the driver is diverted from a defined region, comprising:
classifying driver movements for ascertaining the degree of driver attentiveness during driving of a motor vehicle, using an interior compartment camera, including recording at least a part of the driver, based on the recording, evaluating a movement quantity representing a head movement of the driver, and classifying the head movement of the driver movement as a safety view if the movement quantity correspond to a defined condition;
classifying the head movement of the driver as a safety view; and
based on classifying the head movement of the driver as the safety view, at least one of: (i) a degree of attentiveness of the driver that is not reduced is inferred, and (ii) the driver movement is not taken into account in an evaluation of the degree of attentiveness;
wherein the head movement of the driver is classified as the safety view if a lateral head movement is recognized as the movement quantity;
wherein the lateral head movement is recognized if, starting from a first head orientation, a beginning of a head rotation in a first direction is ascertained, a beginning of a head rotation in the first direction being ascertained if a speed of the head rotation in the first direction corresponds to a defined first speed threshold value or exceeds a defined first speed threshold value.

9. A device configured to classify driver movements for ascertaining the degree of driver attentiveness during driving of a motor vehicle, using an interior compartment camera, the device configured to:
record at least a part of the driver;
based on the recording, evaluate a movement quantity representing a head movement of the driver; and
classify the head movement of the driver as a safety view if the movement quantity corresponds to a defined condition;
wherein the head movement of the driver is classified as the safety view if a lateral head movement is recognized as the movement quantity;
wherein the lateral head movement is recognized if, starting from a first head orientation, a beginning of a head rotation in a first direction is ascertained, a beginning of a head rotation in the first direction being ascertained if a speed of the head rotation in the first direction corresponds to a defined first speed threshold value or exceeds a defined first speed threshold value.

10. A non-transitory computer readable storage medium on which is stored a computer program for classifying driver movements for ascertaining a degree of driver attentiveness during driving of a motor vehicle, using an interior compartment camera, the computer program, when executed by a computer, causing the computer to perform:
recording at least a part of the driver;
based on the recording, evaluating a movement quantity representing a head movement of the driver; and
classifying the head movement of the driver as a safety view if the movement quantity corresponds to a defined condition;
wherein the head movement of the driver is classified as the safety view if a lateral head movement is recognized as the movement quantity;
wherein the lateral head movement is recognized if, starting from a first head orientation, a beginning of a head rotation in a first direction is ascertained, a beginning of a head rotation in the first direction being ascertained if a speed of the head rotation in the first direction corresponds to a defined first speed threshold value or exceeds a defined first speed threshold value.

* * * * *